June 19, 1962    G. T. SHOOSMITH    3,039,427
VOLUMETRIC OUTPUT INDICATING DEVICE
Filed Oct. 20, 1959

Inventor
Guy Taite Shoosmith
By Dowell & Dowell
Attorneys 3,039,427
VOLUMETRIC OUTPUT INDICATING DEVICE
Guy Taite Shoosmith, St. Mary Bourne, England, assignor to Plenty and Son Limited, Newbury, England
Filed Oct. 20, 1959, Ser. No. 847,580
Claims priority, application Great Britain Oct. 24, 1958
3 Claims. (Cl. 116—136.5)

This invention relates to devices for indicating the volumetric output of variable-capacity pumps.

According to the invention, the device comprises a scale which is graduated in volumes per unit time (for example, gallons per minute), and a pointer which is movable along the scale and which is adapted to be connected to the capacity-adjusting member of the pump, the pointer being marked, shaped or formed so that its position along the scale during operation of the pump gives a visual indication of the volumetric output of the pump in respect of at least two liquids of different viscosities.

The "two liquids of different viscosities" mentioned above will, of course, be the two liquids which make up the blend, but it is quite possible for the pointer to give an accurate indication of the volumetric output of the pump in respect of several different liquids if that is desired. In addition, the scale can be graduated so as to include variations in output resulting from different delivery pressures.

In order that the invention may be thoroughly understood, two examples of indicating devices in accordance with it will now be described with reference to the accompanying drawing, in which.

Figure 1:
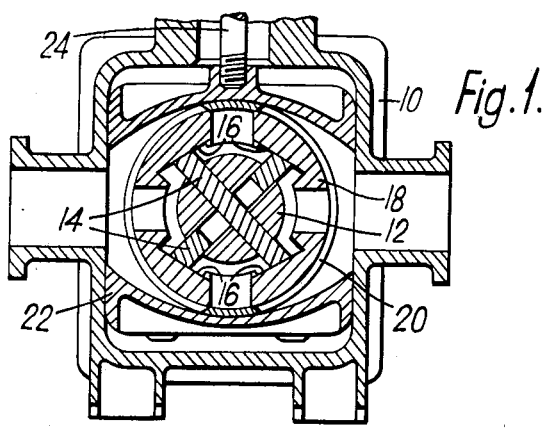
FIGURE 1 is a vertical section through the central portion of a variable-capacity pump to which the invention can be readily applied, the section being in a plane which lies at right angles to the axis of rotation of the pump shaft.

The pump shown in FIGURE 1 is of the variable capacity kind and comprises a casing 10 having a rotor shaft 12 provided with slots which receive sliding vanes 14. The ends of the sliding vanes 14 bear on flat surfaces 16 formed internally on a rotor proper 18 which is mounted for rotation in an apertured sleeve 20 supported in a sliding block 22. The sliding block 22 is mounted for vertical movement within the casing 10 and has a spindle 24 which extends upwards out of the casing. The position of the sliding block controls the volumetric output of the pump which is dependent on the eccentricity between the rotor 18 and the rotor shaft 12.

Figure 2:
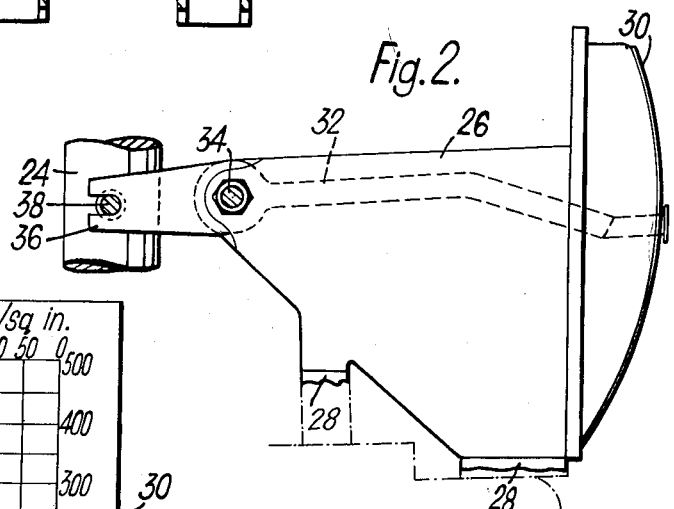
FIGURE 2 is a side view on an enlarged scale of one form of indicating device.

FIGURE 2 shows one form of indicating device which can be used with the pump shown in FIGURE 1. The device comprises a double-walled bracket 26 fixed by downwardly-extending struts 28 to an upper part of the casing 10, and a scale 30 mounted in an upright position on one end of the bracket. As will be seen from FIGURE 3, which shows the scale in end view, the scale is graduated along its length to correspond to the volumetric output of the pump to which the device is fitted. The graduations in this particular device are in barrels per hour, but they could be in any other suitable units of volume and time. The scale is also graduated circumferentially in lb. per square inch to correspond to variations in the delivery pressure of the pump. Further, the scale has its zero mark at the centre so that the direction of flow of liquid through the pump is also indicated.

The pointer 40 which moves over or along the scale is attached to a simple lever 32 pivotally mounted on the bracket 26 at 34 and provided with a forked end 36 which embraces a pin 38 on the capacity-adjusting spindle 24 of the pump. The lever 32 is thus made to follow movements of the capacity-adjusting spindle, the position of which mainly determines the volumetric output of the pump.

Figure 3:
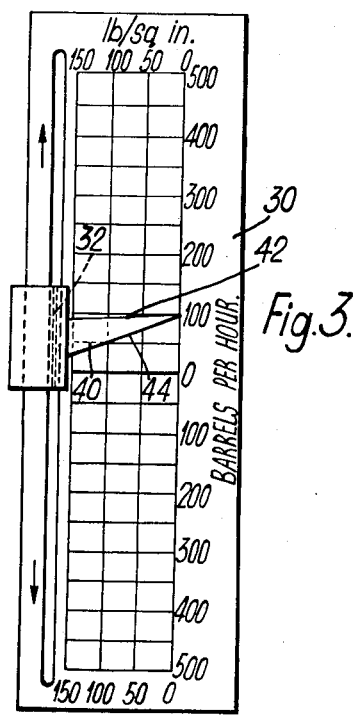
FIGURE 3 is an end view of the scale shown in FIGURE 2 enlarged still further so as to show details clearly.

The pointer 40 on the lever 32 is level with the scale 30 and is of triangular shape as shown in FIGURE 3. The reason for this is that the volumetric output of the pump at a given delivery pressure is slightly different for liquids of different viscosity. Thus, one edge 42 of the triangle gives the volumetric output when the pump is handling heavy fuel, and another edge 44 of the triangle gives the volumetric output when the pump is handling light fuel. In other words the pointer 40 is adapted to apply a correction to the reading on the scale 30.

Figure 4:
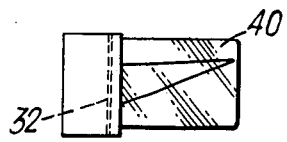
FIGURE 4 shows a modification of the pointer shown in FIGURES 2 and 3.

The shape and construction of the pointer 40 can be widely varied. If desired, it can be made of transparent material such as perspex and have a series of lines on it which correspond to various grades of liquid suitable for blending. A pointer of this construction is shown, for example, in FIGURE 4. It need not, moreover, be a "pointer" in the strict sense of that word, but can have any shape which allows it to indicate which graduations on the scale are appropriate when the pump is handling any one of the liquids which are to be blended.

The indicating device of the present invention is applicable to many different kinds of variable-capacity pump and is not restricted to the specific pump shown in the drawings.

I claim:

1. For use in indicating the volumetric output of a variable-capacity pump having a capacity-adjusting member: an indicating device comprising a single scale, a first set of markings on said scale corresponding to volumes per unit time, a second set of markings on said scale corresponding to variations in said volumetric output of said pump resulting from different delivery pressures, said second set of markings extending transversely to said first set of markings, a pointer movable along and overlying said scale, connecting means attached to said pointer and adapted to connect said pointer to said capacity-adjusting member of said pump, first scale-reading means on said pointer extending in a straight line at a first predetermined inclination across said scale and arranged to give a visual indication of said volumetric output of said pump in respect of a first liquid, second scale-reading means on said pointer extending in a straight line at a second predetermined inclination across said scale and arranged to give a visual indication of said volumetric output of said pump in respect of a second liquid, said first inclined means and said second inclined means being at such different inclinations and being of such different lengths as to be unsymmetrical on said pointer.

2. An indicating device as claimed in claim 1 wherein said first inclined means and said second inclined means of said pointer comprise a first edge and a second edge respectively of a triangular-shaped element.

3. An indicating device as claimed in claim 1 wherein said first inclined means and said second inclined means of said pointer comprise a first marking and a second marking respectively on a transparent element.

References Cited in the file of this patent
UNITED STATES PATENTS

| | | |
|---|---|---|
| 1,806,462 | Hopkins | May 19, 1931 |
| 2,149,143 | Landenberger | Feb. 28, 1939 |
| 2,351,372 | Snyder | June 13, 1944 |
| 2,697,147 | Harland | Dec. 14, 1954 |

FOREIGN PATENTS

| | | |
|---|---|---|
| 509,842 | Great Britain | July 24, 1939 |